A. LAPHAM.
Shears.
No. 143,454.
Patented Oct. 7, 1873.
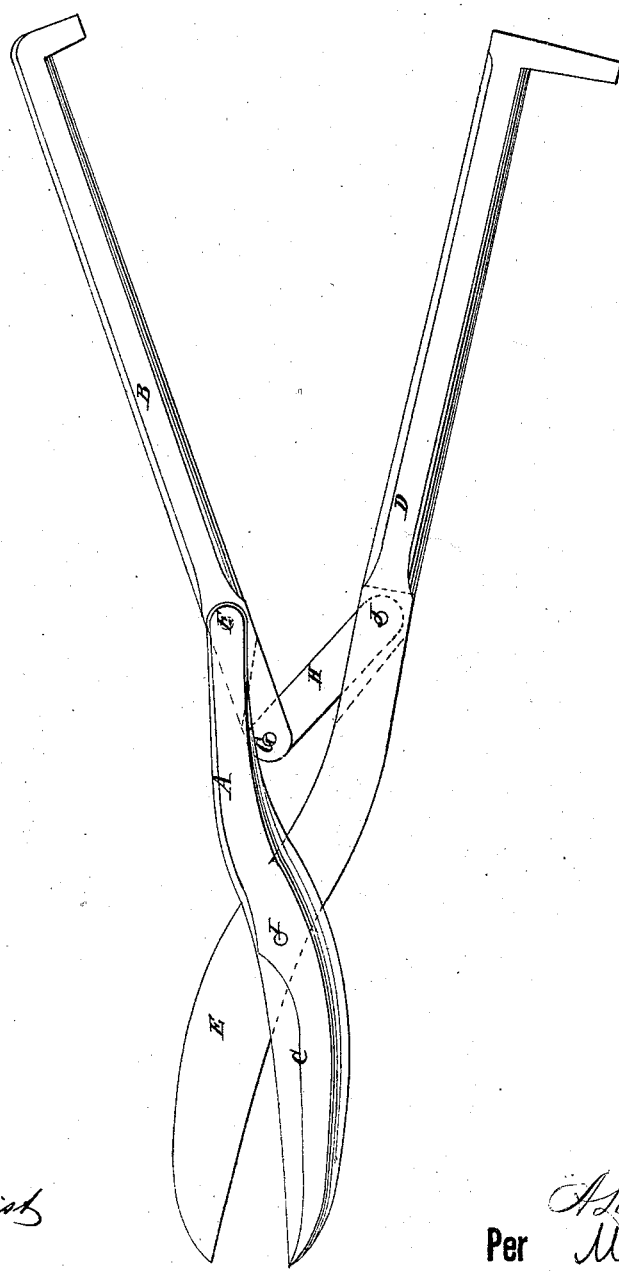
Witnesses:
A. W. Almqvist
Sedgwick
Inventor:
A. Lapham
Per Munn & Co.
Attorneys.

UNITED STATES PATENT OFFICE.

ALLEN LAPHAM, OF PATERSON, NEW JERSEY, ASSIGNOR TO HIMSELF AND ORVILLE W. LEONARD, OF SAME PLACE.

IMPROVEMENT IN SHEARS.

Specification forming part of Letters Patent No. 143,454, dated October 7, 1873; application filed August 23, 1873.

*To all whom it may concern:*

Be it known that I, ALLEN LAPHAM, of Paterson, in the county of Passaic and State of New Jersey, have invented a new and Improved Snip-Shears, of which the following is a specification:

The invention consists of a compound-lever arrangement of one of the arms or handles of the shears, to increase the leverage, which said arrangement is produced by making the said handle or arm in two sections, of which the one which is a part of the blade, and terminates a little beyond the pivot by which the two blades are connected together, is pivoted at said end to the other section a short distance above its lower end, and the latter is connected by a link to the other arm or handle for a fulcrum, and it extends from the pivot which connects the two sections along with the other handle to its end, and is used with it in the same manner as in ordinary shears, except that it makes a wider sweep to open the blades, but it gives double the power, or more. The improvement is designed more particularly for the "snip"-shears used by tinners and others for cutting sheet metal.

The drawing is a side elevation of a pair of snip-shears constructed according to my invention.

A and B represent the two sections employed for the arm or lever of one of the blades C. D represents the arm or lever of the other blade, E, constructed in one piece in the ordinary way. F is the pivot by which the section A is jointed to section B a short distance above its lower end G, which is pivoted to one end of a short link, H, whose other end is pivoted to the arm D, so that it becomes the fulcrum of the section B, which acts on the end of section A with all the leverage due to the differences in the distances from the pivot F to the two ends, and this force is multiplied by the section A through the pivot I, so as to make a powerful shears. The link H is also a movable fulcrum to the lever B, as is needed by the moving of the pivot F. Moreover, the arrangement is such that, by the raising of the lever B to open the blades, the link H swings up toward an upright position, or toward a right line between pivots F and J, so that there is not such a loss of motion, or, in other words, increase of motion of lever B, as there would be if it was pivoted to a stationary fulcrum. This is essential for opening the blades sufficiently; but it does not interfere with the closing of them with great force, because the link D comes down nearly to the line of the arm D before the cutting begins.

Having thus described my invention, I claim as new and desire to secure by Letters Patent—

The combination of two arm-sections, A B, pivoted at E, the one-piece arm D pivoted to A at I, and the strap H pivoted to B D, respectively, at S and H, as and for the purpose described.

ALLEN LAPHAM.

Witnesses:
H. C. HUDSON,
JOHN F. NEILL.